(12) United States Patent
Huber et al.

(10) Patent No.: US 6,840,097 B1
(45) Date of Patent: Jan. 11, 2005

(54) INSPECTION APPARATUS FOR TIRES

(75) Inventors: Rainer Huber, Piding (DE); Bernd Leitner, Neubeuern (DE); Hans Steinbichler, Neubeuern (DE); Junli Sun, Raubling-Nickelheim (DE); Volker Rasenberger, Raubling-Grossholzhausen (DE); Thomas Köhler, Riedering (DE); Thomas Leitner, Nussdorf (DE); Josef Engelsberger, Bad Feilnbach (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 0 days.

(21) Appl. No.: 09/546,893

(22) Filed: Apr. 10, 2000

(30) Foreign Application Priority Data

Apr. 9, 1999 (DE) .................... 299 06 376 U
Sep. 3, 1999 (DE) ......................... 199 42 155
Sep. 15, 1999 (DE) ......................... 199 44 314

(51) Int. Cl.⁷ .................... G01M 17/02; B60C 23/02; B63B 9/08
(52) U.S. Cl. ............... 73/146; 73/152; 73/705; 73/146.8; 73/8; 73/9; 356/346; 356/347; 356/348; 356/498; 356/511
(58) Field of Search ............... 73/146–146.8, 73/705, 152, 8, 9; 356/346–348, 498, 511, 139.09; 378/4, 20, 61; 209/81, 82

(56) References Cited

U.S. PATENT DOCUMENTS

| 4,004,693 A | * | 1/1977 | Tsuji et al. ............ 209/81 |
| 4,225,238 A | * | 9/1980 | Rottenkolber ............ 356/348 |
| 4,234,256 A |   | 11/1980 | Yeager |
| 4,785,354 A | * | 11/1988 | Nakamura et al. ............ 378/4 |
| 4,798,964 A | * | 1/1989 | Schmalfuss et al. ... 250/559.22 |
| 5,293,687 A |   | 3/1994 | Willoughby, Jr. et al. |
| 5,600,435 A |   | 2/1997 | Bartko et al. |
| 5,777,219 A | * | 7/1998 | Popio et al. ............ 73/146 |
| 6,041,649 A | * | 3/2000 | Fembock ............ 73/146 |
| 6,050,136 A | * | 4/2000 | Hawkinson et al. ......... 73/146 |
| 6,067,848 A | * | 5/2000 | Siegfried et al. ............ 73/146 |

FOREIGN PATENT DOCUMENTS

| DE | 2913601 | 10/1979 |
| DE | 3546149 | 7/1986 |
| DE | 4231578 | 3/1994 |
| DE | 19608528 | 9/1997 |
| DE | 19731486 | 1/1999 |
| EP | 0039143 | 11/1981 |
| EP | 0823623 | 2/1998 |
| EP | 0893670 | 1/1999 |

OTHER PUBLICATIONS

Patent Abstracts of Japan P–1673, Jan. 12, 1994, vol. 18, No. 18 & JP5–256738, Oct. 5, 1993.
Patent Abstracts of Japan vol. 011, No. 208 (p–593), Jul. 7, 1987 & JP62 030943, Feb. 9, 1987.
Patent Abstracts of Japan vol. 016, No. 163, Apr. 21, 1992 & JP04 012214, Jan. 16, 1992.

\* cited by examiner

Primary Examiner—Daniel J. Colilla
Assistant Examiner—Marissa Ferguson
(74) Attorney, Agent, or Firm—Dilworth & Barrese LLP

(57) ABSTRACT

The present invention relates to an inspection apparatus for tires having a positioning device for the tire to be inspected and a laser inspection device. In accordance with the invention, the inspection device comprises several measuring heads, in particular laser measuring heads in order to reduce the inspection time. In accordance with one aspect of the invention, several observation units and associated lighting sources are integrated in each measuring head.

30 Claims, 11 Drawing Sheets

INSPECTION APPARATUS FOR TIRES

BACKGROUND OF THE INVENTION

The innovation relates to an inspection apparatus for tyres having a positioning device for the tyre to be inspected and having an inspection device, in particular a laser inspection device.

Such inspection apparatuses are already known in practice. They can be disposed in a pressure chamber or a vacuum chamber. The positioning device in question is preferably a work table having an aperture, for example a circular aperture, in the region of which the inspection device, for example a laser inspection device is located. The laser inspection device can also be travelled into the tyre from above. The laser inspection device (measuring probe, laser inspection probe) can preferably be swivelled in order to sweep over a certain region, preferably the whole interior region of the tyre, and thereby to check the tyre, for example for defective areas. If the inspection apparatus is located inside a vacuum chamber, defective areas will appear more clearly thanks to the vacuum and can also be detected better and more reliably by the inspection device or the laser inspection device.

SUMMARY OF THE INVENTION

It is the object of the innovation to improve an inspection apparatus of this kind.

This object is solved in accordance with the innovation in that the inspection device possesses several measuring heads or laser measuring heads. In this way, the time required for the inspection of the tyre can be reduced.

Advantageous embodiments are described herein.

The inspection device is preferably pivoted. Instead of or in addition to this, the tyre positioning device can also be pivoted. By means of a rotation of the inspection device with the measurement heads located thereon and/or of the positioning device with the tyre to be inspected, a relative movement or a relative rotation is achieved between measuring heads and tyres.

Advantageously here, the measuring heads are disposed at an equal angular distance to one another. For example, three measuring heads can be provided whose angular distance to one another is 120° in each case. When two measuring heads are used, their angular distance to one another is preferably 180°, when four measuring heads are used, 90° in each case. However, it is also possible to dispose even more measuring heads. In this way, the apparatus complexity is increased, but the inspection time can be reduced even further.

Another advantageous improvement is characterized in that the measuring heads are adjustably supported on the inspection device. Preferably, each individual measuring head is disposed adjustably and arrestably in each case on the inspection device. The adjustment can be made automatically or manually. The measuring heads can be adjustable outwardly or inwardly, preferably in a radial direction in relation to the axis of rotation of the inspection device. Instead of or in addition to this, the measuring heads can be adjustable upwardly or downwardly, preferably parallel to the axis of rotation of the inspection device and/or the positioning device which preferably have a vertical course. Instead of or in addition to this, the measuring heads can be adjustable in their orientation or in the orientation of the camera of each of the measuring heads.

In accordance with another advantageous improvement, a mirror is provided. Preferably, several mirrors are provided, preferably in accordance with the number of measuring heads. By means of the use of correspondingly disposed mirrors, areas of the tyre which are otherwise difficult to access can also be checked.

In accordance with another aspect of the invention, the inspection apparatus for tyres is characterized in that at least one measuring head is provided with a plurality of observation units and lighting sources allocated thereto.

The observation units are integrated in the measuring head. They are mounted movably as a unit with the lighting sources. By means of the plurality of observation units in one measuring head, several regions of the tyre to be inspected can be observed and inspected simultaneously. In this way, the inspection time required can be substantially reduced. Thanks to the integration in one measuring head in each case, the movement control of the observation units or lighting sources is simplified.

In an improvement of the invention, a plurality of lighting sources are allocated to each of the observation units. Preferably, laser light sources are disposed in two rows, with each of the observation units being disposed between two rows of laser light sources. The disposition of the lighting sources on different sides of the observation unit effects the illumination of the tyre region to be inspected from different directions and allows an improved observation of the tyre.

In accordance with a preferred embodiment of the invention, the measuring head possesses a modular design. It consists of several measuring head segments which can be joined together having in each case one observation unit and several lighting sources allocated thereto.

Each of the observation units can possess a camera.

In accordance with an alternative embodiment, each of the observation units can possess several cameras, with a beam splitter being able, but not having to be positioned in front of the cameras which has the effect that each camera observes its own separate region. The object light reflected from the tyre surface is split into several parts and guided to the individual cameras by the beam splitter. The cameras can also take individual regions separately. The observation region of the corresponding observation unit is therefore split into several observation regions by the beam splitter so that each camera sees its own region. Thanks to the disposition of several cameras in one observation unit, the lateral resolution of the observation unit is improved.

In an improvement of the invention, the observation units and/or the lighting units are designed to be swivellable around at least one axis and/or travellable along at least one axis.

The observation units and/or the lighting sources can be movable relative to the measuring head in each case.

In accordance with another embodiment of the invention, the observation units and/or the lighting sources can be movable as one unit together with the measuring head.

Preferably, each measuring head is designed swivellably and travellably through several axes. In this way, a great movability of the measuring head and the observation units and lighting sources integrated therein is achieved. The tyre to be inspected can be travelled over, with the measuring head in each case being able to be moved into the most favourable position for the inspection of the tyre.

The necessary relative movement between measuring head and tyre can also be achieved by a corresponding movement of the positioning device for the tyre to be inspected. Due to the weight of the tyre and the positioning device, it can, however, be advantageous to move the measuring head. The necessary actuators can be built more easily and the travel movement can be effected more easily.

In an improvement of the invention, at least one mirror can be allocated to each of the observation units and/or lighting sources. With the aid of such mirrors, even areas of the tyre which are difficult to access can be observed and checked. Preferably, the mirrors are designed swivellably and/or travellably in each case, in particular with multiple axes in each case in order to travel over the tyre surface accordingly.

In accordance with another aspect of the present invention, the inspection apparatus for tyres is characterized in that a device for the detection of the size and/or position of the tyre and a control device are provided, which positions the at least one measuring head in accordance with the detected size and/or position of the tyre. Irrespective of the number of measuring heads and/or observation units and lighting sources, such an array has the advantage that that the inspection procedure can be effected in a largely automated manner and that the inspection apparatus adapts independently to the relevant type of tyre. The control device automatically determines the necessary measuring head position and positions the measuring head(s) in such a way that the inspection of the tyre can be performed. Irrespective of the type of tyre, the measuring head is always automatically placed in the correct inspection position relative to the tyre. The positioning can, if necessary, be effected by a corresponding movement of the tyre using its positioning device. Preferably, however, the measuring heads are travelled and swivelled into their inspection positions.

In accordance with one embodiment of the invention, the detection of the tyre size and/or position can be effected by means of an arrangement which determines the tyre size, in particular its diameter and width, by means of shadow projection. To this purpose, at least one lighting source is provided to illuminate the tyre and one observation unit which detects the shadow projected by the tyre. Preferably, the tyre is here moved laterally to the direction of illumination. The inner diameter and the outer diameter of the tyre and its width can be determined from the movement of the tyre and the changing shadow thrown. The determination of the tyre size can also be effected with other means, e.g. light barriers. As the tyre is transported into the apparatus, the movement of the tyre in conjunction with the light barriers can be used to determine the diameter.

To allow fabric damage in the tyre to be detected, in an improvement of the invention the inspection apparatus can possess an X-ray device to X-ray the tyre.

Moreover, a voltage measuring apparatus having at least one electrode and a counterpart working together with this can be provided, with the electrode and its counterpart being able to be positioned on different sides of the tyre. The counterpart can preferably be designed as a metal roller which follows the covering movement of the electrode on the opposite side of the tyre by rolling down. If a voltage, in particular a high voltage, is applied to the electrode, which can be designed as a strap or wire chain or the like, nail holes in the tyre and other damage of this kind can easily be detected.

One advantageous embodiment of the invention further comprises an overpressure device inspection being performed to detect casing weakness. The tyre is subjected to overpressure by means of an overpressure device. With the resulting blowing up of the tyre, those areas where the casing is weak are easy to recognise as a stronger bulge-like expansion takes place there.

In addition, a surface control of the inner side for cracks can be performed by means of a camera with an image processing system.

The tyre inspection apparatus preferably possesses a device for the joint presentation of the results of the different single inspections. The casing assessment allows a secure inspection of the tyre due to several of the methods given.

BRIEF DESCRIPTION OF THE DRAWINGS

Preferred embodiments of the invention are described in detail below by means of the attached drawing in which.

DESCRIPTION OF THE PREFERRED EMBODIMENTS

Figure 1:
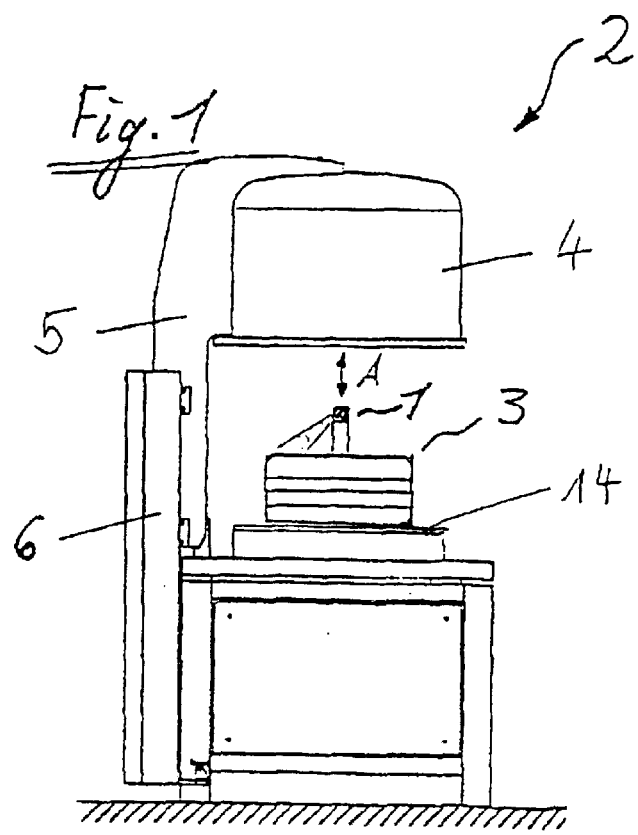
FIG. 1 shows an inspection apparatus for tyres having a vacuum chamber in an opened position in a side view.
Figure 2:
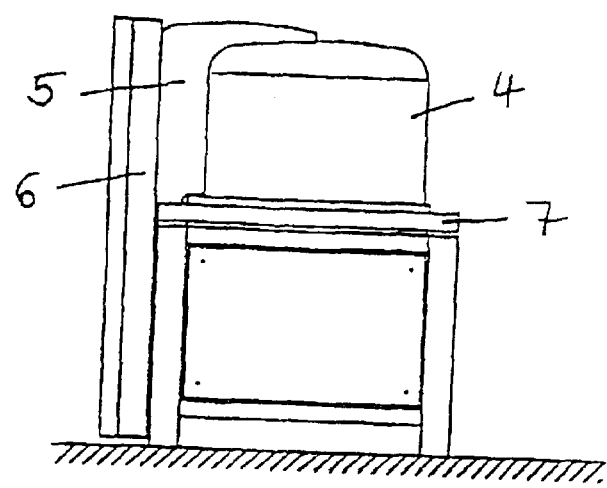
FIG. 2 shows the inspection apparatus having a vacuum chamber in accordance with FIG. 1 in the closed position, also in a side view.

In FIG. 1, an inspection apparatus for tyres is shown which possesses a measuring head 1 which is located in the inner region of a tyre 3. The inspection apparatus is surrounded by a vacuum chamber 2 which possesses a hood 4 which is disposed on a vertically movable slide 5. The slide 5 is vertically movable in a guide 6. It can be travelled downwards into the closed position shown in FIG. 2 in which the hood 4 sealingly contacts the table 7. In this position, a vacuum is applied inside the hood 4 by a vacuum pump (not shown in the drawing) so that defective areas of the tyre 3 can be detected better.

Figure 3:
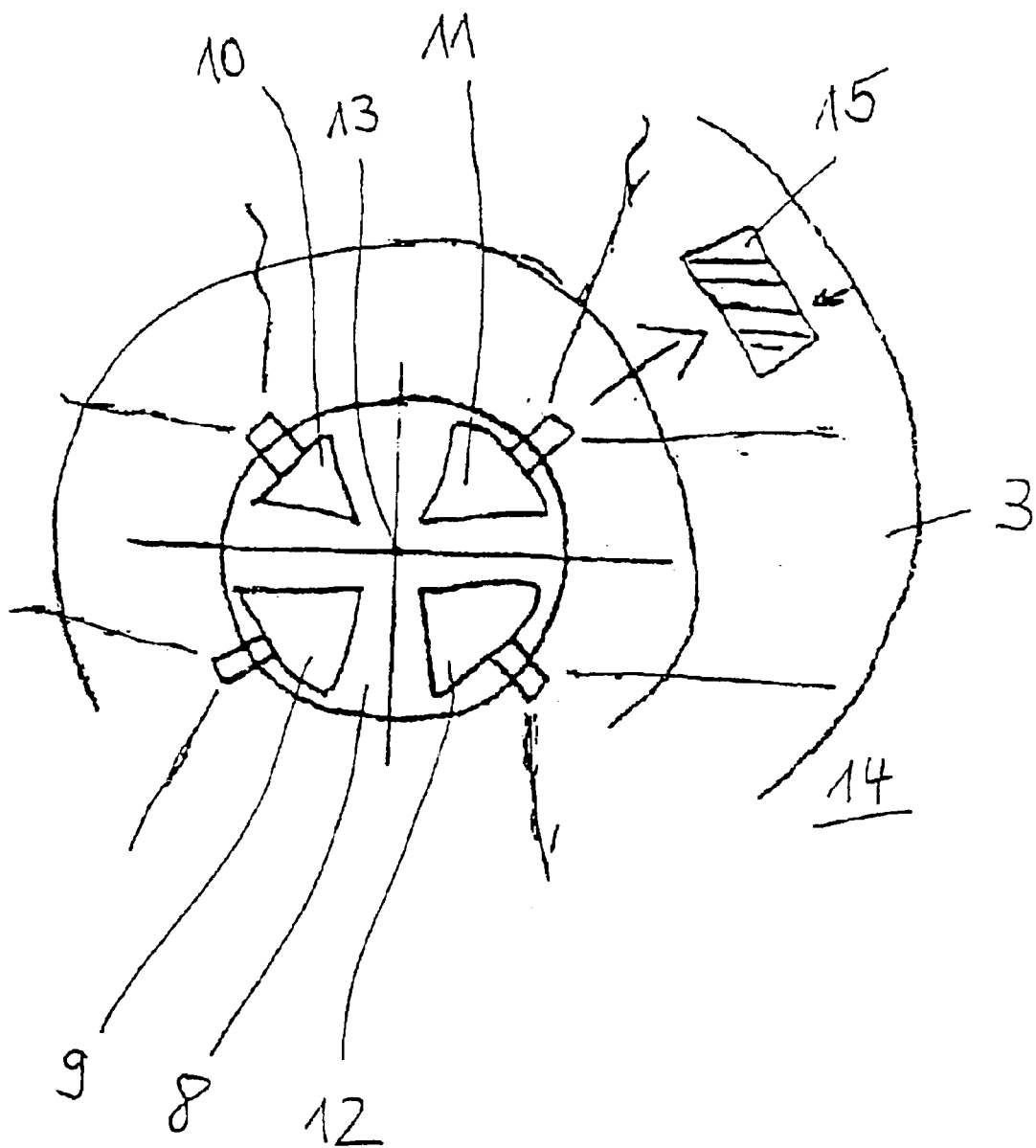
FIG. 3 shows a part of the inspection apparatus in a top view.

As can be seen from FIG. 3, the inspection apparatus possesses an inspection device 8 which consists of a table and four laser measuring heads 9, 10, 11, 12 which are disposed on the table 8 at an angular distance to one another of 90° in each case. The inspection device 8 is pivoted around its vertical central axis 13.

The tyre 3 contacts a table 14 forming its positioning device which table possesses at its centre a circular aperture concentric with the vertical axis 13, within which aperture the inspection device 8 is located. The table 14 can be pivoted. The inspection device can also be moved into the tyre from above.

The inspection device 8 is adjustable in a vertical direction, that is along the axis 13. It is first travelled downwards below the level of the table 14. After the tyre 3 has contacted the table 14, the inspection device 8 travels upwards in a vertical direction into the working position in which it is located inside the aperture of the table 14 and inside the tyre 3. By means of a rotation of 90°0 around the axis 13, all laser measuring heads 9 to 12 can sweep and inspect the whole inner region of the tyre 3.

Mirrors 15 (for reasons of a simplified drawing representation, only one mirror 15 is shown in FIG. 3) are disposed above the tyre 3. One mirror 15 is allocated to each laser measuring head 9 to 12; the mirror 15 drawn in FIG. 3 is allocated to the laser measuring head 11. By means of the mirror, it is possible to inspect the top mantle surface of the tyre 3. The tyre is turned to inspect the bottom mantle surface of the tyre.

The measuring heads 9 to 12 are disposed adjustably on the inspection device 8. They can be adjusted outwardly and inwardly in a radial direction in relation to the vertical axis 13. Furthermore, they can be adjusted upwardly and downwardly. Finally, the orientation of the cameras of the laser measuring heads 9 to 12 can be changed. By means of a change in the camera orientation, it can, for example, be achieved that the camera "looks" from top to bottom or from inside the tyre to the top.

Thanks to the innovation, a further development of the tyre inspection apparatus is provided which possesses the special feature that several measuring heads can be used at different positions. In this way, inspection time is saved as several sectors can be taken and inspected simultaneously or practically simultaneously. Moreover, the rotation procedure of the measuring head and/or the tyre is simplified as a relative rotation possibility through 360° no longer needs to be provided, but rather a correspondingly lower relative rotation possibility depending on the number of measuring heads used. The disposition of the measuring heads can be selected so that they detect different sectors of the tyre simultaneously or measure the tyre in different views simultaneously or both. For example, with two measuring heads, two sectors of the tread of a tyre can be inspected simultaneously. It is, however, also possible to inspect one view of the of the tread and simultaneously one view in the bead or sidewall region of the tyre.

In addition, the several measuring heads can also be rotated around the tyre axis 13. When, for example, four measuring heads are used and one possibility to rotate these four measuring heads spread equally on the circumference by 45°, eight sectors of the tyre tread can be detected within the time otherwise required for two single shots.

The number of measuring heads can be varied. For example, three measuring heads can be used in three positions or two measuring heads in two positions. In accordance with another preferred arrangement, two measuring heads can be used for the sidewall of the tyre and two measuring heads for the tread of the tyre.

Figure 4:
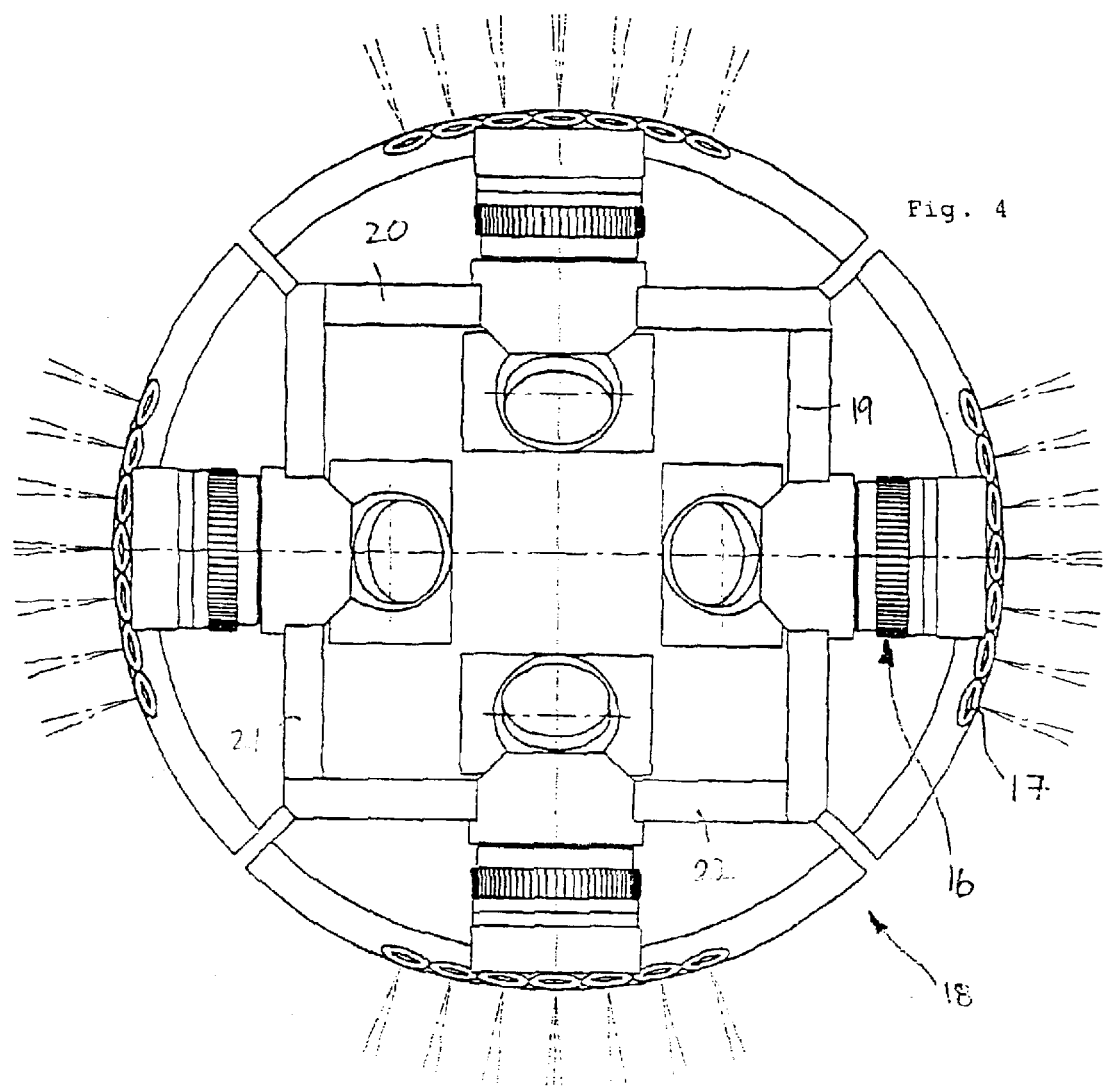
FIG. 4 shows a top view of a measuring head with several observation units and lighting sources allocated thereto in accordance with a preferred embodiment of the invention.
Figure 5:
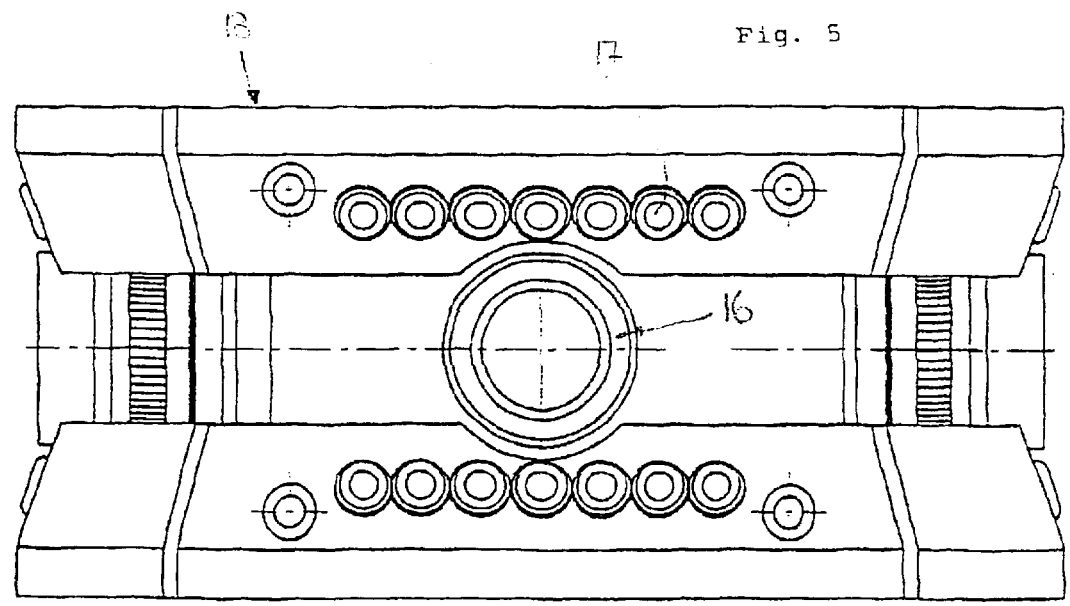
FIG. 5 shows a side view of the measuring head of FIG. 4.

FIGS. 4 and 5 show a measuring head in accordance with a preferred embodiment of the invention in which a plurality of observation units 16 and a plurality of lighting sources 17 are integrated. Laser light sources are preferably provided as lighting sources 17. The observation units 16 possess one or more cameras as will be explained below.

As FIG. 4 shows, the measuring head 18 is made up of four identical measuring head segments 19, 20, 21, 22 which each possess an observation unit 16 and 14 lighting sources 17. The observation units 16 are disposed in pairs diametrically opposite one another, the splitting between the observation units is equal and is 45° in the case shown.

In each measuring head segment, the lighting sources 17 are disposed in two rows parallel to each other, with the associated observation unit 16 being between the lighting sources 17 in each case or looking through the lighting sources (see FIG. 5).

Figure 6:
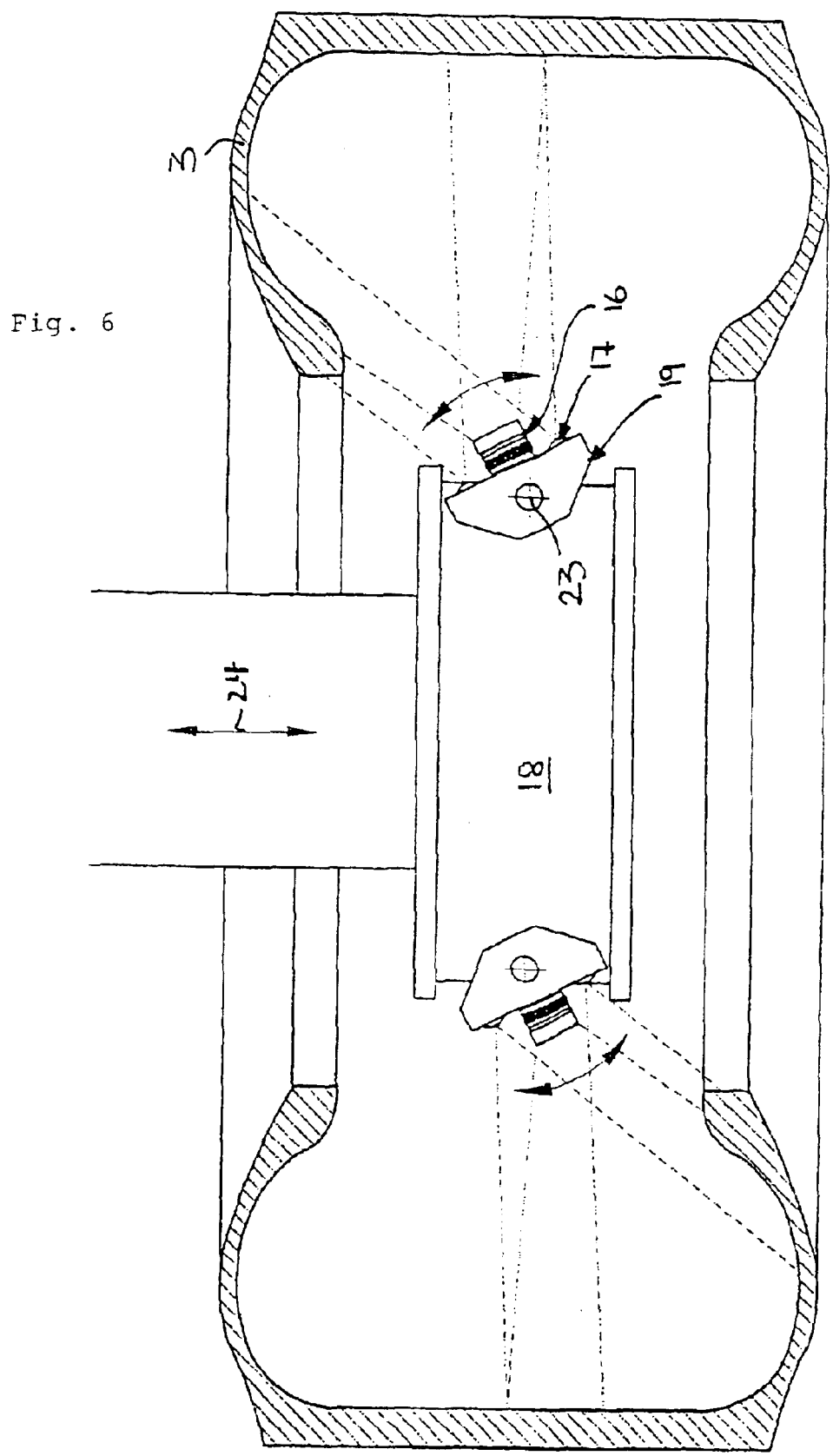
FIG. 6 shows a measuring head with observation units and lighting sources swivellable affixed thereto in accordance with a preferred embodiment of the invention in a schematic representation.

The measuring head segments 19, 20, 21, 22 or the corresponding illumination units 16 and lighting sources 17 can be rigidly mounted on the measuring head 18 and be movably supported or guided as a unit together with this. In accordance with another embodiment of the invention (cf FIG. 6), however, it can also be provided that the single measuring head segments, i.e. the individual observation units 16, are supported movably with the lighting sources 17 allocated thereto on the measuring head 18. In particular, the observation units 16 with the associated lighting sources 17 can be supported on the measuring head 18 swivellably through an axis. In this way, on the one hand, the measuring head 18 can be travelled or rotated and swivelled as a whole with the observation units 16 and lighting sources 17 integrated therein. On the other hand, the observation units 16 can still be swivelled relative to the measuring head 18 and aligned with the tyre surface to be covered, whereby an optimum observation of the tyre surface to be inspected is made possible. As FIG. 6 shows, the swivel axes 23 of the measuring head segments 19, 20, 21 and 22 lie in the plane of rotation of the tyre 3—in a tangential direction to an imaginary circle around the axis of rotation of the tyre. The measuring head 18 itself is travellable along an axis 24 perpendicular to the plane of rotation of the tyre 3, i.e. vertically adjustable when the tyre is on its side. In addition, the measuring head 18 can be rotated as a whole through the axis 24 so that the observation units 16 can search the inner surface of the tyre 3.

Figure 7:
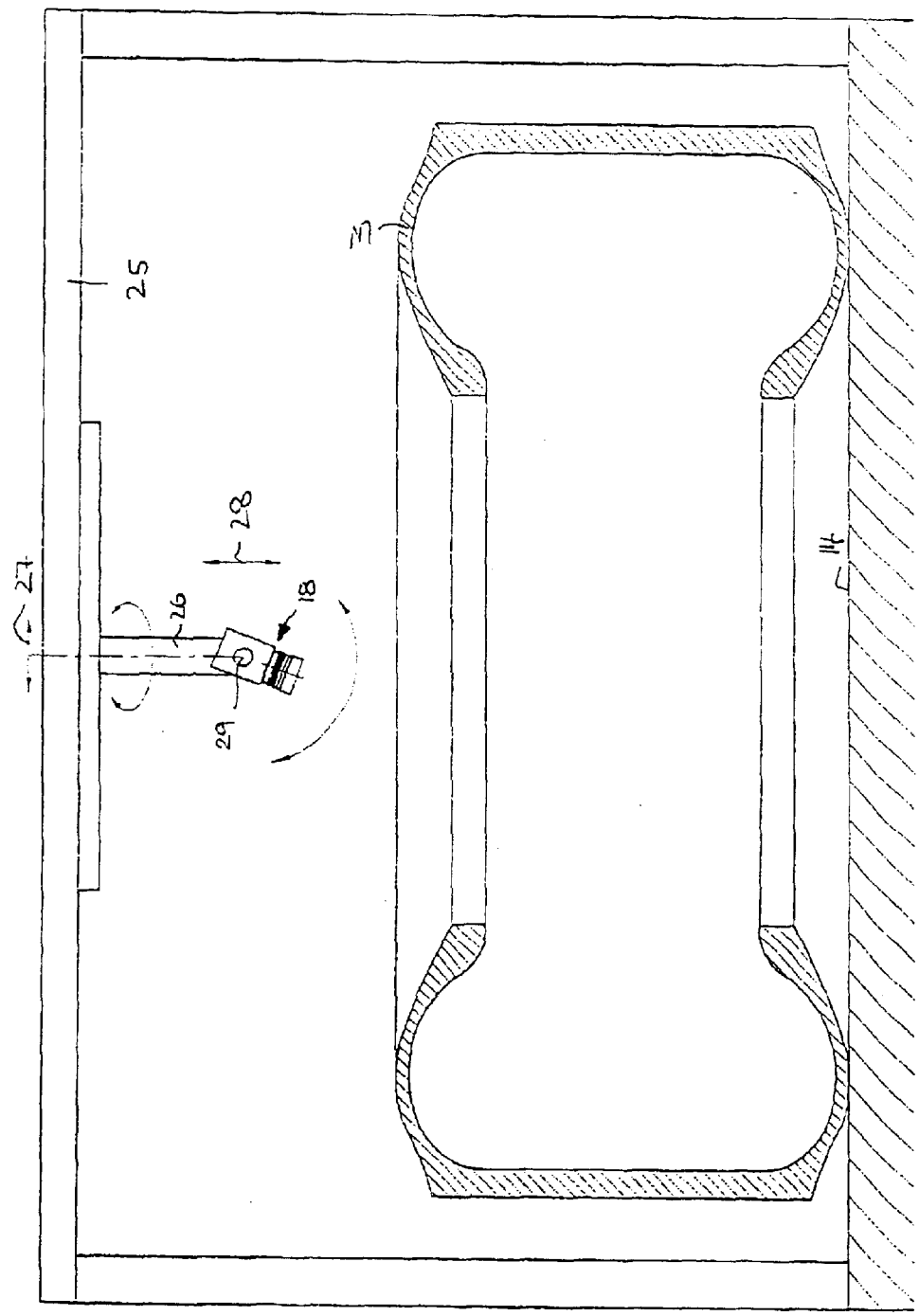
FIG. 7 shows a single measuring head in a schematic representation which shows the movability of the measuring head.

The drives to travel the measuring head 18 can be located inside or outside the tyre 3. FIG. 7 shows an embodiment of the invention in which the measuring head 18 is supported on a portal 25. A holder 26 extending downwards from the portal 25 for the measuring head 18 can be travelled biaxially on the portal 25 along the axis designed by 27 in FIG. 7 and along an axis perpendicular thereto. Furthermore, the holder 26 can be rotated around its longitudinal axis or around an axis perpendicular to the contact surface of the positioning device 14 for the tyre 3. The measuring head 18 can be moved up and down along the holder 26 along the axis 28. The vertical adjustability of the measuring head 18 along the axis 28 can also be performed by an adjustment of the holder 26 itself, in particular by a longitudinal setting of the holder 26. As FIG. 7 shows, the measuring head 18 is furthermore swivellably attached around an axis 29 to the holder 26. The swivel axis 28 of the measuring head 18 is preferably perpendicular to the holder 26. The swivel axis 28 of the measuring head 18 is preferably perpendicular to the axis of rotation of the holder 26.

The measuring head 18 or where appropriate a plurality of measuring heads is therefore disposed above the tyre and articulated and supported from above. As FIG. 7 shows, the hanging support of the measuring head allows a simplified design of the base on which the tyre is supported. In particular, the base 14 can be formed in one piece, for example as a simple plate. In the base there need be no recesses, openings or the like in which the measuring head can be accepted and through which the measuring head can be travelled (cf FIG. 7).

Figure 8:
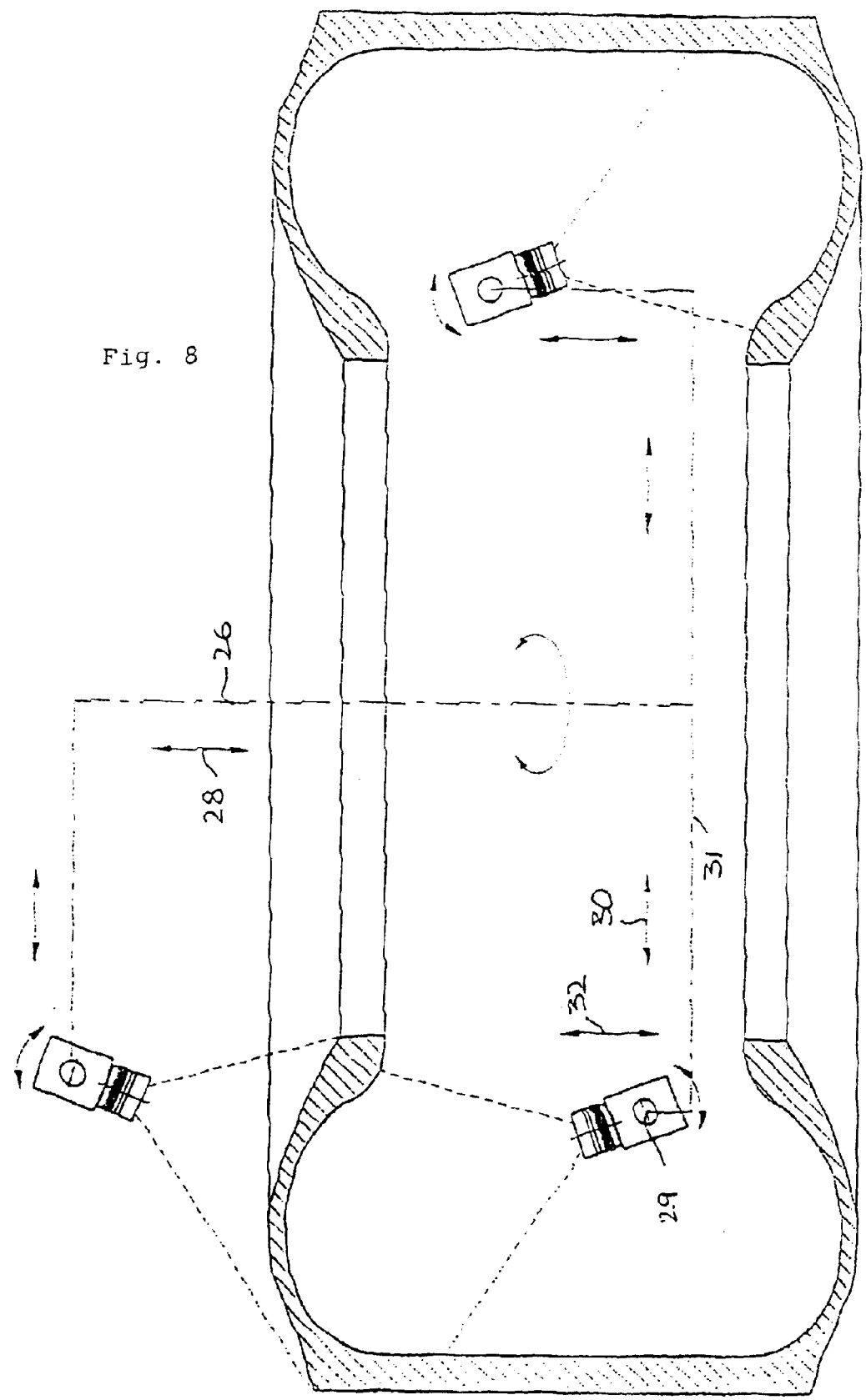
FIG. 8 shows an inspection apparatus with several measuring heads in accordance with a preferred embodiment of the invention in a schematic representation which shows the multi-axial movability of the single measuring heads.

In order to effect the tyre inspection in a reduced time, several measuring heads 18 can be provided which are also supported in each case multi-axially movably. As FIG. 8 shows, three measuring heads 18 can be provided of which two inspect the inner side of the tyre casing and one its outer side. Preferably, the measuring heads are attached like the previously described embodiment to a holder 26 which may be supported on a portal. The holder 26 is vertically adjustable in the manner previously described along the axis 28 and rotatable around its longitudinal axis. The measuring heads 18 are each attached multi-axially adjustably to the holder 26. On the one hand, they can be travelled along radial axes 30, i.e. they are settable in their distance to the holder 26. In this way, the inspection apparatus can be set or adapted to different tyre diameters. Furthermore, all measuring heads 18 are swivellably supported in each case around a swivel axis 29 on the beam 31 by means of which they are connected to the holder 26. The swivel axes of the measuring heads 18 extend preferably tangentially to imaginary circles around the axis of rotation of the tyre 3. Furthermore, for the inspection of the inner side of the tyre 3, the measuring heads 18 are vertically adjustable relative to the holder 26 along the axes designated with 32 in FIG. 8 which extend parallel to the adjustment axis 28 of the holder 26. The measuring heads 18 can therefore be vertically adjusted together by means of the holder 26; furthermore, a vertical adjustment of the measuring heads 18 can be effected relative to the holder 26 along the axes 32.

The exhaustive adjustability of the measuring heads 18 separately from one another or simultaneously with one another allows, on the one hand, an optimum adjustment of the single measuring heads to the tyre section to be inspected in each case. On the other hand, after an individual adjustment, the tyre can be travelled over with a simple kinematic control, namely a rotation of the holder 26 through its longitudinal axis.

Figure 9:
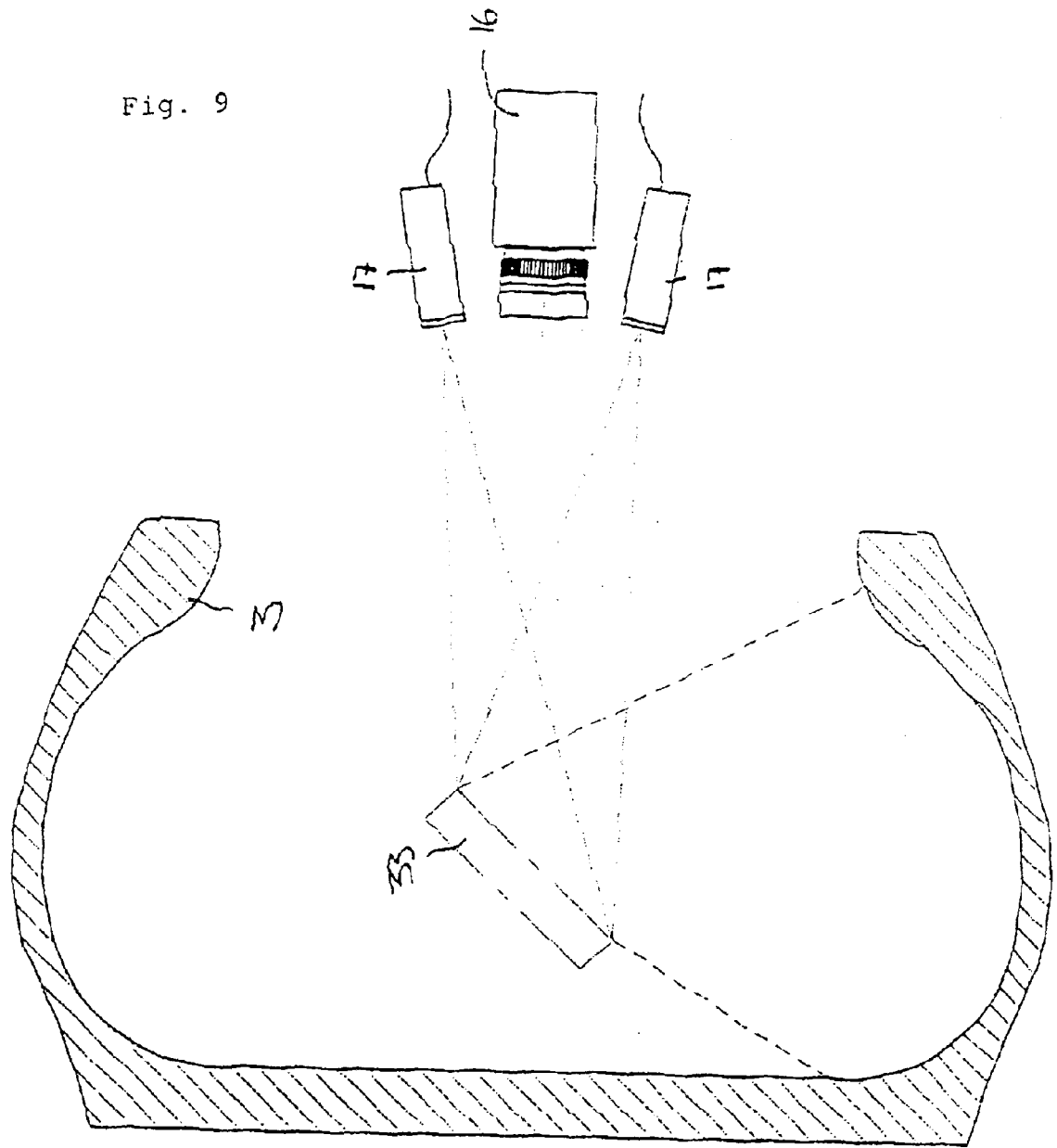
FIG. 9 shows an individual measuring head with an observation head and allocated lighting sources which illuminates and observes the inner surface of the tyre by means of a mirror.

The lighting and/or the observation of the tyre surface can also be effected using mirrors. For this purpose, each observation unit 16 and the associated lighting sources 17 are allocated a mirror 33 which projects the light emitted by the lighting sources 17 onto the tyre region to be observed. The observation units 16 observe the illuminated region via the mirror 33 as well. As FIG. 9 shows, this mirror 3 can be disposed on the inside of the tyre in order to inspect the inner side of the tyre. Advantageously, the mirror is multiaxially travellable and swivellable in order to be adjusted exactly in such a way that each desired region of the type can be illuminated and observed. With the aid of such a mirror 33, areas which are difficult to access, into which the relatively bulky measuring head 19 could only be positioned with difficulty, can also be observed and inspected.

Figure 10:
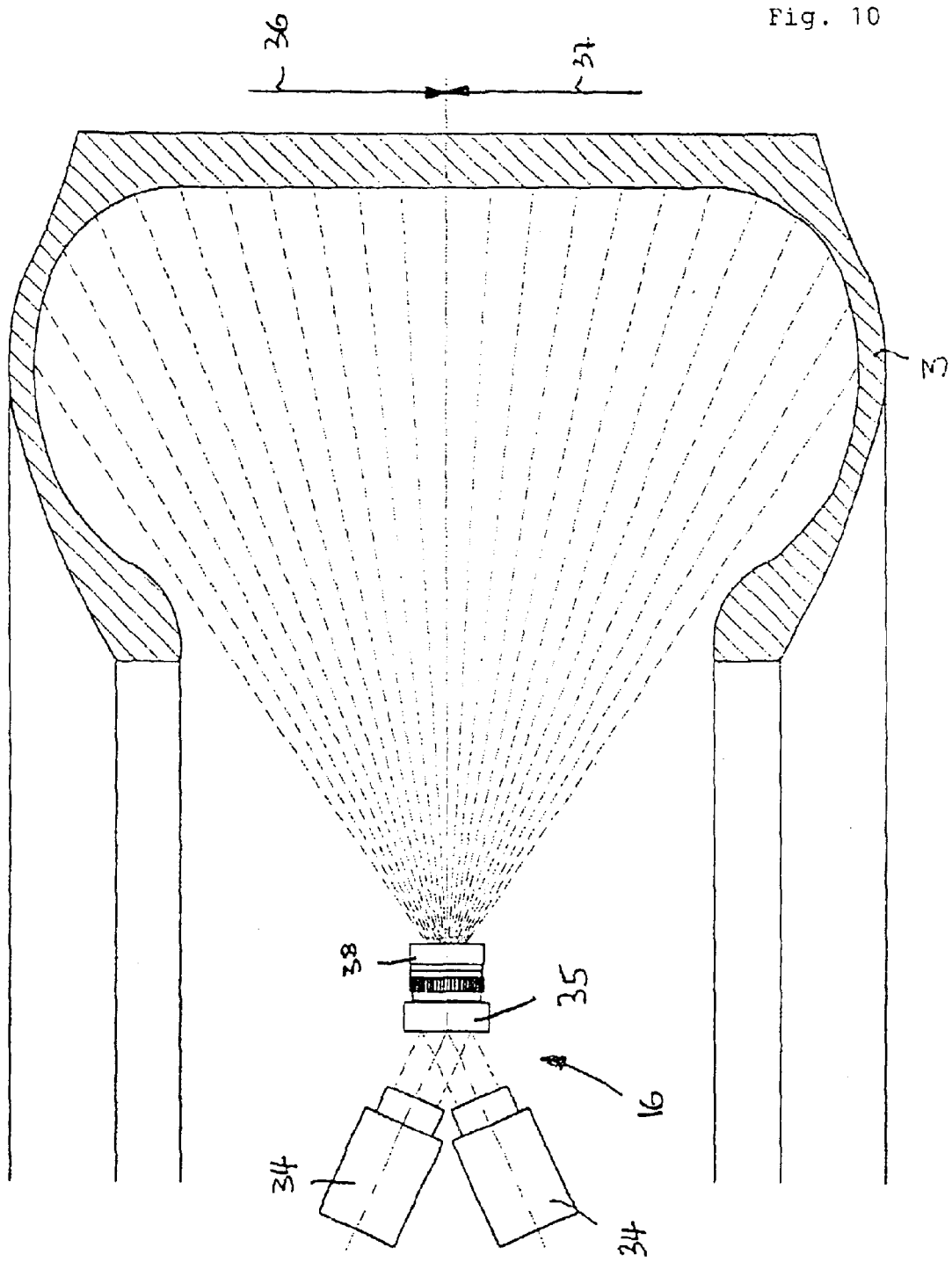
FIG. 10 shows an observation unit with two cameras and a beam splitter positioned in front thereof in accordance with a preferred embodiment of the invention in which the viewing region of the observation unit is split onto the two cameras.

To improve the lateral resolution of the observation units 16, they may each possess two cameras 34 with a beam splitter 35 positioned in front of them, as shown in FIG. 10. The beam splitter 35 splits the region to be observed by the observation unit 16 into two regions which are each observed by a camera 34. In FIG. 10, the top half 36 of the observation region is visible to the top camera 34 and the bottom half 37 of the observed region of the inner side of the tyre to the bottom camera 34 in FIG. 10. Although this is not shown in FIG. 10, the two cameras 34 and the beam splitter 35 and the optical systems 38 positioned in front of them are appropriately combined into one unit which is integrated in the corresponding measuring head 18.

To automate the inspection procedure to the greatest possible extent, the inspection device adjusts automatically to different tyre types. For this purpose, the tyre size and the position of the tyre on the positioning device is detected and the necessary measuring head positions determined automatically. Preferably, the determination of the outer and inner diameters and of the width of the tyre is performed by means of shadow projection.

Figure 11:
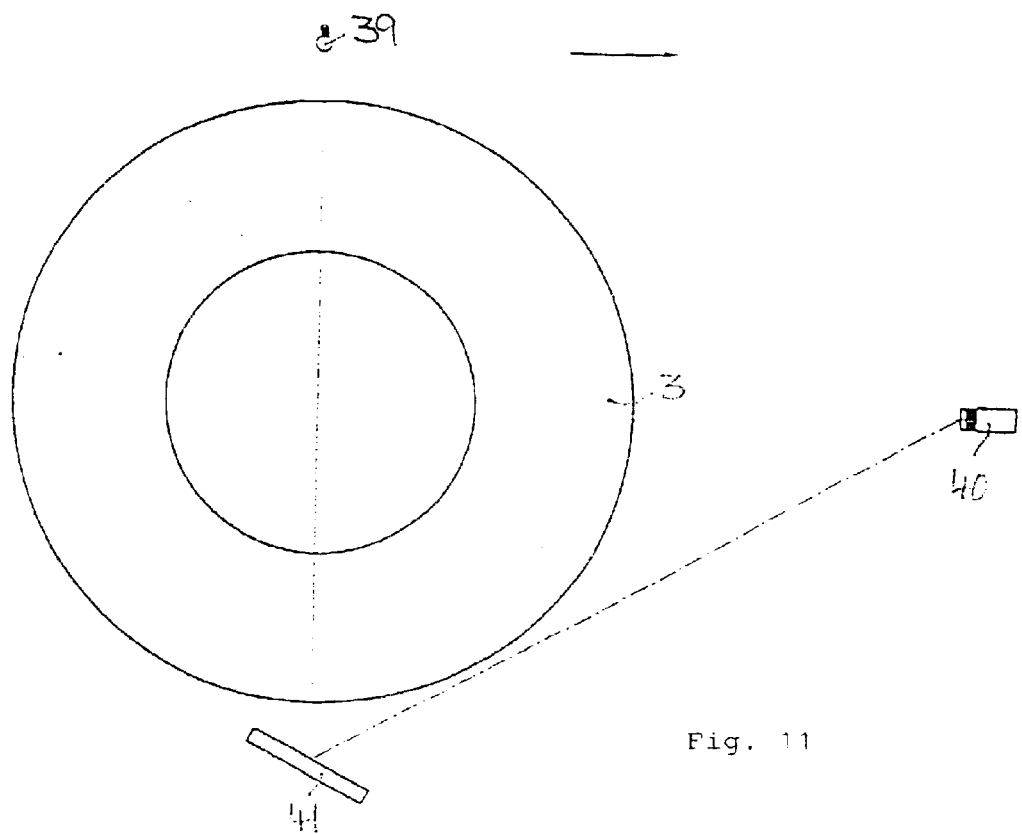
FIG. 11 shows the arrangement of a lighting source and an observation unit to detect the outer diameter of the tyre by means of shadow projection in a schematic representation.

In accordance with a preferred embodiment of the invention, for this purpose a lighting source 39 is disposed on one side of the tyre 3 and an observation unit 40 on another side of the tyre. The observation unit 40 is here disposed in such a way that it detects the light arriving on the side of the tyre 3 opposite to the lighting source 39 when the tyre is not in the way of the light emitted by the lighting source 39. As FIG. 11 shows, this can also be done by means of a mirror 41 which is disposed diametrically opposite to the lighting source 39 and which deflects the light coming from the lighting source 39 to the observation unit 40.

The tyre 3 is moved laterally to the direction of the light spreading from the lighting source 39 and guided through the corresponding light beam. The outer diameter of the tyre 3 can be determined from the length of time of the shadow projection of the tyre 3 and from the movement speed or the path of the tyre. Instead of the movement of the tyre 3, the lighting source 39 can also be moved with the mirror 41 or the observation unit 39.

Figure 12:
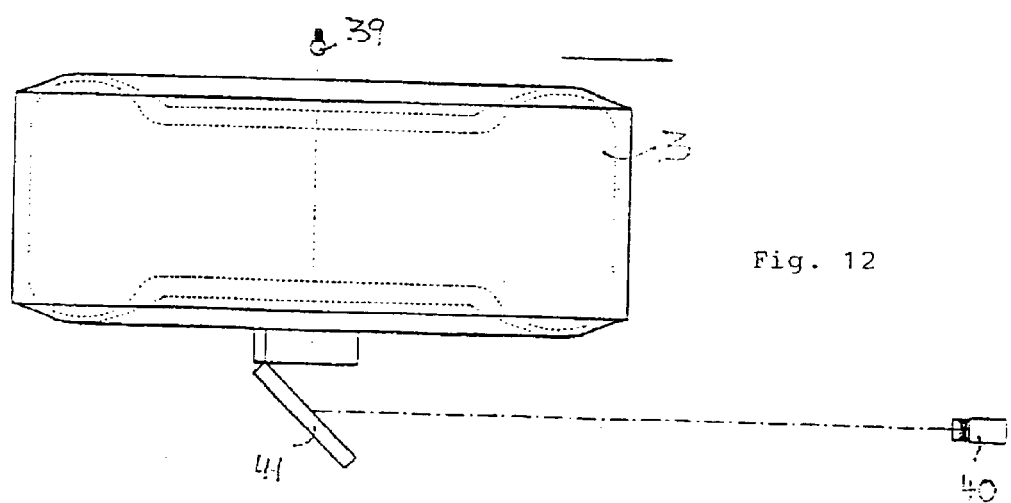
FIG. 12 shows the arrangement of a lighting source and an observation unit to determine the inner diameter of the tyre in a presentation similar to FIG. 11.

FIG. 12 shows the arrangement of another lighting source, of another mirror and another observation unit to determine the inner diameter of the tyre 3. The arrangement is made in such a way that the light beam can penetrate the inner recess of the tyre 3. The tyre 3 can in turn be moved laterally to the direction of the light beam. Otherwise, the arrangement of FIG. 12 corresponds to the principle shown in FIG. 11.

Figure 13:
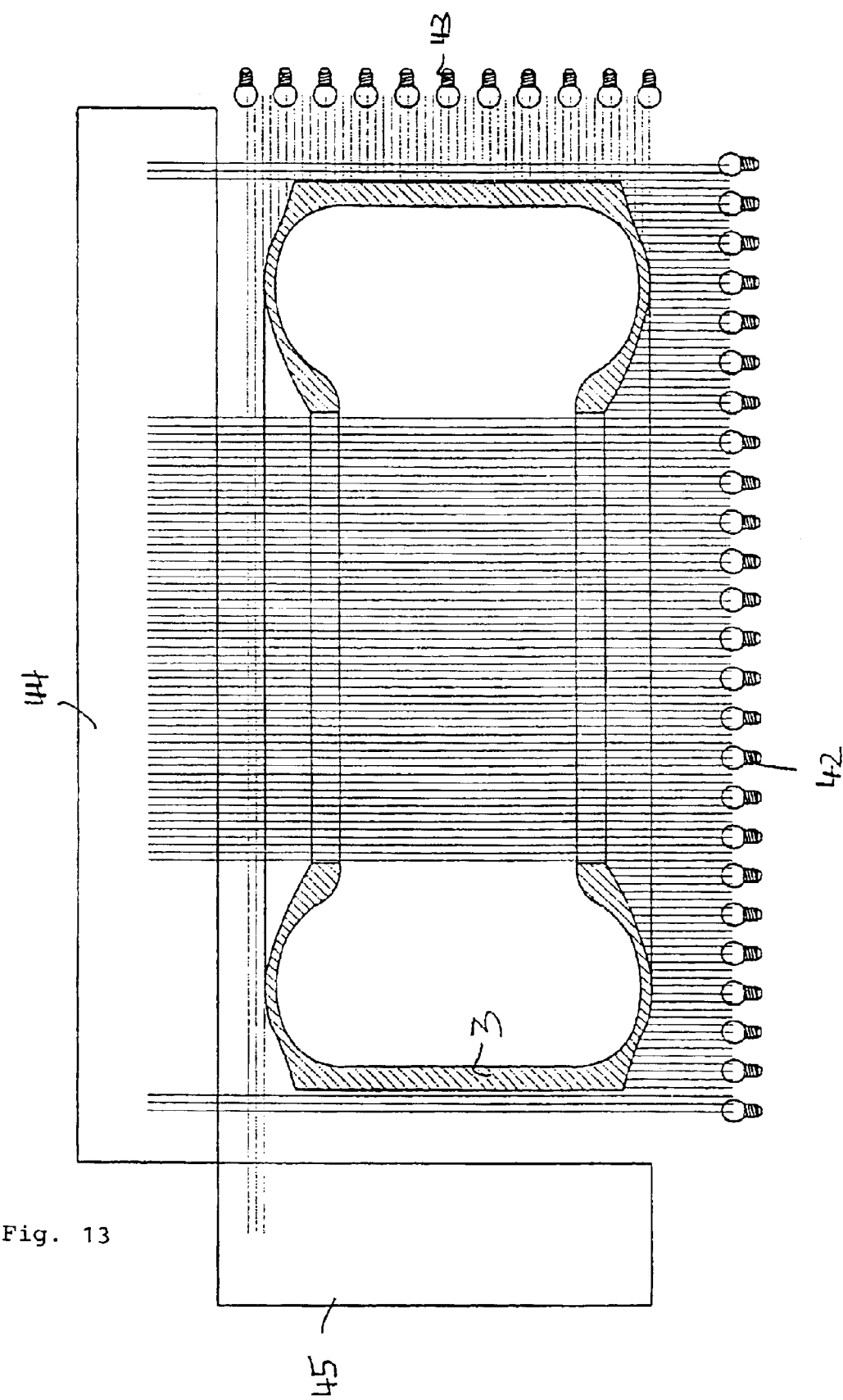
FIG. 13 shows the arrangement of several lighting sources and two lighting screens to determine the inner and outer diameters of the tyre and its width by means of shadow projection in accordance with a preferred embodiment of the invention.

The size and/or position of the tyre 3 can also be determined with the aid of a plurality of lighting sources 43. As FIG. 13 shows, in this arrangement a first row of lighting sources 42 is disposed on a first side of the tyre 3, with the low being longer than the maximum diameter of the tyre 3. A second row of lighting sources 43 is disposed on one side of the tyre opposite its circumferential surface, with the row being longer than the maximum width of the tyre 3. Allocated to the lighting sources 42 and 43 are screens 44 or 45 on the opposite side of the tyre 3 in each case which detect the light in each case passing by the outside of the tyre or penetrating the inner recess of the tyre 3. The width, inner diameter and outer diameter of the tyre 3 can be determined from its shadow projection in each case.

A control device not shown in the figures evaluates the data representing the size and position of the tyre and controls the drives of the measuring heads in such a way that the measuring heads are automatically travelled to their corresponding inspection position. Here, where required, the tyre 3 can also be moved accordingly.

To achieve a full inspection of the tyre, the inspection apparatus possesses further inspection units in addition to the optical observation and/or inspection device.

Figure 14:
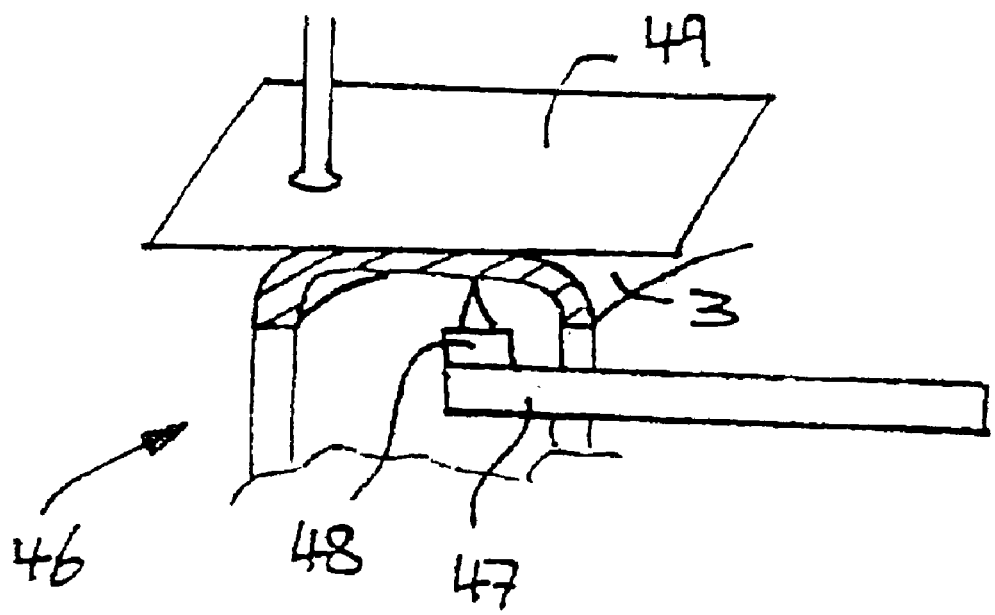
FIG. 14 shows an X-ray unit to X-ray the tyre to detect fabric damage in the tyre.

In an improvement of the invention, in particular an X-ray unit 46 can be provided. This can possess an X-ray head 47 having an X-ray source 48 disposed thereon and a detector 49 working together therewith. Appropriately, the X-ray head 47 and the detector 49 working together therewith are positionable on opposite sides of the tyre mantle so that the tyre wall can be X-rayed by the X-rays. The X-ray head 47 and the detector 49 are here travellable in such a way that the tyre wall can be travelled over in full. Where required, the tyre can also be moved accordingly. Appropriately, the X-ray head 47 is moved to position this. The travelling over the tyre is then performed by a rotation of the tyre around its axis of rotation. With the aid of such an X-ray device, fabric damage in the tyre can be detected (cf FIG. 14).

Figure 15:
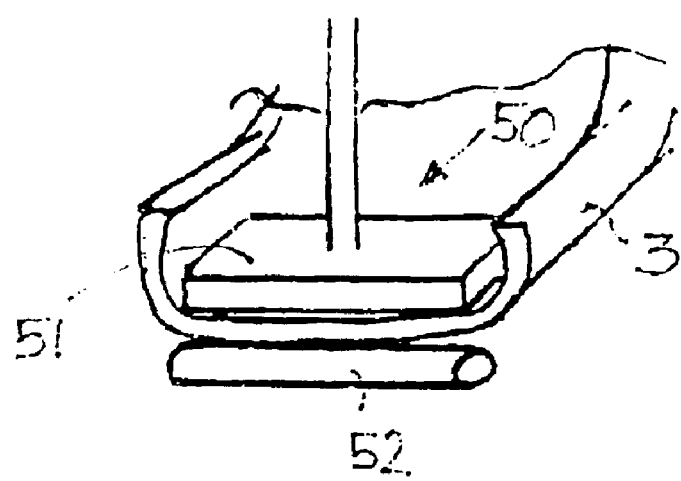
FIG. 15 shows a voltage testing unit for the high voltage current measurement to check the tyre in accordance with a preferred embodiment of the invention.

In an improvement of the invention, in addition a voltage measuring apparatus 50 can be provided for the high voltage current measurement of, for example, nail holes in the tyre 3. The voltage measuring apparatus 50 possesses, as shown in FIG. 15, a high voltage electrode 51 which can be designed as a strap, a wire chain or the like and a metal roller 52 which works together with the high voltage electrode 51. The high voltage electrode 51 and the metal roller 52 are positionable on opposite sides of the tyre 3 in such a way that the tyre wall comes to lie between the high voltage electrode 51 and the metal roller 52. By means of a corresponding relative movement between the tyre 3 and the high voltage electrode 51 and the metal roller 52, the tyre is travelled over, with the electrode 51 and the metal roller 52 always remaining opposite each other. In the event of nail holes or the like, dielectric breakdown occurs which shows the corresponding damage in the tyre.

Furthermore, and without this being shown in the drawings, the tyre 3 can be subjected to an overpressure inspection of casing weakness or a surface control of the inner side for cracks by means of a camera having an image processing system. Also not shown in the drawings is a device with the aid of which a joint presentation of the results of the different single inspections can be effected and the corresponding casing assessment be made.

What is claimed is:

1. An inspection apparatus for tires (3), comprising
a device (14) structured and arranged for positioning a tire (3) to be inspected,
an inspection device (8) structured and arranged to inspect the thus-positioned tire (3) by the positioning device (14), and
a pressure chamber (2) structured and arranged to be positioned about said positioning device (14) to encompass the tire (3) positioned thereon, wherein
said inspection device (8) comprises several measuring heads (9, 10, 11, 12),
said inspection device (8) is structured and arranged to inspect an inner radial side of the tire (3) positioned upon said positioning device (14),
said inspection device (8) comprising said measuring heads (9–12) are structured and arranged to be movable from a position outside the tire (3) to a position within the inner radial edge of the tire (3) positioned upon said positioning device (14) to inspect the inner radial side of the tire (3) for defects, and
said pressure chamber (2) is a vacuum chamber comprising a movable hood (4).

2. The apparatus of claim 1, wherein said measuring heads (9–12) are laser measuring heads.

3. The apparatus of claim 1, wherein at least one of said inspection device (8) and positioning device (14) is pivotally mounted.

4. The apparatus of claim 1, wherein said measuring heads (9–12) are disposed at substantially equally angular distances with respect to one another upon said inspection device (8).

5. The apparatus of claim 1, wherein said measuring heads (9–12) are adjustably supported upon said inspection device (8).

6. The apparatus of claim 1, comprising at least one mirror (15) structured and arranged to direct light from at least one of the measuring heads (9–12) to a location on the tire (3) not normally accessible, to check this location of the tire (3) for defects.

7. An inspection apparatus for tires (3) comprising
a positioning device (14) structured and arranged for positioning a tire (3) to be inspected thereon,
an inspection device (8) structured and arranged for inspecting the thus-positioned tire (3) positioned upon said positioning device (14), and
a pressure chamber (2) structured and arranged to be positioned about said positioning device (14) and encompass the tire (3) to be inspected upon the positioning device (14), the tire (3) being mounted in the absence of a wheel rim and being subject to pressure from both inside and outside,
wherein said inspection device (8) comprises several measuring heads (9, 10, 11, 12), each measuring head comprising at least one observation unit (16) and at least one lighting source (17),
said measuring heads structured and arranged to be directed in different directions so that different sections of the tire (3) can be inspected simultaneously, and
each said measuring head being structured and arranged to be both swivelable on at least one axis (29) and translationally movable on at least one axis (27, 28, 30, 32).

8. The apparatus of claim 7, wherein said pressure chamber (2) is a vacuum chamber (2) provided with a movable hood (4), and additionally comprising
a vertically movable slide (5) upon which said hood (4) is mounted and
a guide (6) in which said slide (5) is movably mounted such that said hood (4) can be moved from a position above said positioning device (14) to position providing a seal about said positioning device (14) and tire (3) positioned thereon and encompass the same.

9. The apparatus according to claim 7, wherein said inspection device (8) is structured and arranged to inspect an inner radial side of the tire (3) positioned upon said positioning device (14).

10. The apparatus of claim 9, wherein said inspection device (8) is movably positioned within the inner radial edge of a tire (3) positioned upon said positioning device (14) to inspect the same for defects.

11. The apparatus of claim 7, wherein said inspection device (8) is a laser inspection device.

12. The apparatus of claim 11, wherein each said observation unit (16) comprises a plurality of said lighting sources

(17) structured and arranged such that each said observation unit (16) is situated between two rows of laser light sources (17).

13. The apparatus of claim 7, wherein said measuring head (18) possesses modular structure.

14. The apparatus of claim 7, wherein each said observation unit (16) possesses at least one camera (34).

15. The apparatus of claim 14, wherein each said observation unit (16) possesses several cameras (34).

16. The apparatus of claim 7, wherein said measuring head (18) is structured and arranged such that said observation unit (16) and/or lighting sources (17) can be moved as a unit therewith.

17. The apparatus of claim 7, wherein said measuring head (18) is structured and arranged such that said observation unit (16) and/or lighting sources (17) are movable relative to said measuring head (18).

18. The apparatus of claim 7, wherein each said measuring head (18) is structured and arranged to be both swivelable and translationally movable on multiple axes (27, 28, 29, 30, 32).

19. The apparatus of claim 7, additionally comprising at least one mirror (33) allocated to each said observation unit (16) and/or lighting source (17).

20. The apparatus of claim 19, wherein said at least one mirror (33) is mounted to be both swivelable and translationally movable.

21. The apparatus of claim 7, additionally comprising:
a device (39, 40; 41–45) structured and arranged to detect size and/or position of the tire (3), and
a control device structured and arranged for positioning said at least one measuring head (18) according to the detected size and/or position of the tire (3).

22. The apparatus in accordance with claim 7, additionally comprising an overpressure device arranged to apply overpressure to the tire (3).

23. The apparatus of claim 7, wherein said measuring heads (9–12) are structured and arranged to be movable from outside the tire (3) to a position within an inner radial edge of the tire (3) positioned upon said positioning device (14) to inspect the inner radial side of the tire (3) for defects.

24. An inspection apparatus for tires (3), comprising
a device (14) structured and arranged for positioning a tire (3) to be inspected,
an inspection device (8) structured and arranged to inspect the thus-positioned tire (3) by the positioning device (14), and
a pressure chamber (2) structured and arranged to be positioned about said positioning device (14) to encompass the tire (3) positioned thereon, wherein
said inspection device (8) comprises several measuring heads (9, 10, 11, 12),
said inspection device (8) is structured and arranged to inspect an inner radial side of the tire (3) positioned upon said positioning device (14),
said inspection device (8) comprising said measuring heads (9–12) are structured and arranged to be movable to a position within the inner radial edge of the tire (3) positioned upon said positioning device (14) to inspect the inner radial side of the tire (3) for defects, and
said inspection device (8) comprises at least one lighting source (39; 42, 43) structured and arranged for illuminating the tire (3) and one observation unit (40; 44, 45) structured and arranged for detecting a shadow projected by the tire (3).

25. An inspection apparatus for tires (3), comprising
a device (14) structured and arranged for positioning a tire (3) to be inspected,
an inspection device (8) structured and arranged to inspect the thus-positioned tire (3) by the positioning device (14), and
a pressure chamber (2) structured and arranged to be positioned about said positioning device (14) to encompass the tire (3) positioned thereon, wherein
said inspection device (8) comprises several measuring heads (9, 10, 11, 12),
said inspection device (8) is structured and arranged to inspect an inner radial side of the tire (3) positioned upon said positioning device (14),
said inspection device (8) comprising said measuring heads (9–12) are structured and arranged to be movable to a position within the inner radial edge of the tire (3) positioned upon said positioning device (14) to inspect the inner radial side of the tire (3) for defects, and
additionally comprising an X-ray device (40) structured and arranged to X-ray the tire (3).

26. An inspection apparatus for tires (3), comprising
a device (14) structured and arranged for positioned a tire (3) to be inspected,
an inspection device (8) structured and arranged to inspect the thus-positioned tire (3) by the positioning device (14),
a pressure chamber (2) structured and arranged to be positioned about said positioning device (14) to encompass the tire (3) positioned thereon,
wherein, said inspection device (8) comprises several measuring heads (9, 10, 11, 12), and additionally comprising
a voltage measuring apparatus (50) having at least one electrode (51) and a counterpart (52) operating together, with said electrode (51) and counterpart (52) structured and arranged to be positioned upon different sides of the tire (3).

27. An inspection for tires (3) apparatus, comprising
a device (14) structured and arranged for positioning a tire (3) to be inspected,
an inspection device (8) structured and arranged to inspect the thus-positioned tire (3) by the positioning device (14), and
a pressure chamber (2) structured and arranged to be positioned about said positioning device (14) to encompass the tire (3) positioned thereon, wherein
said inspection device (8) comprises several measuring heads (9, 10, 11, 12),
said inspection device (8) is structured and arranged to inspect an inner radial side of the tire (3) positioned upon said positioning device (14),
said inspection device (8) comprising said measuring heads (9–12) are structured and arranged to be movable to a position within the inner radial edge of the tire (3) positioned upon said positioning device (14) to inspect the inner radial side of the tire (3) for defects, and
additionally comprising an overpressure device arranged to apply overpressure to the tire (3).

28. An inspection apparatus for tires (3), comprising
a device (14) structured and arranged for positioning a tire (3) to be inspected,
an inspection device (8) structured and arranged to inspect the thus-positioned tire (3) by the positioning device (14), and a pressure chamber (2) structured and arranged to be positioned about said positioning device (14) to encompass the tire (3) positioned thereon, wherein said inspection device (8) comprises several measuring heads (9, 10, 11, 12), said inspection device (8) is structured and arranged to inspect an inner radial side of the tire (3) positioned upon said positioning device (14), said inspection device (8) comprising said measuring heads (9–12) are structured and arranged to be movable to a position within the inner radial edge of the tire (3) positioned upon said positioning device (14) to inspect the inner radial side of the tire (3) for defects, and said inspecting device (3) comprises a camera and image processing system connected thereto.

29. An inspection apparatus for tires (3), comprising a device (14) structured and arranged for positioning a tire (3) to be inspected, an inspection device (8) structured and arranged to inspect the thus-positioned tire (3) by the positioning device (14), and a pressure chamber (2) structured and arranged to be positioned about said positioning device (14) to encompass the tire (3) positioned thereon, wherein said inspection device (8) comprises several measuring heads (9, 10, 11, 12), said inspection device (8) is structured and arranged to inspect an inner radial side of the tire (3) positioned upon said positioning device (14), said inspection device (8) comprising said measuring heads (9–12) are structured and arranged to be movable to a position within the inner radial edge of the tire (3) positioned upon said positioning device (14) to inspect the inner radial side of the tire (3) for defects, and additionally comprising a device for joint presentation of results of different angle inspections of the tire (3).

30. An inspection apparatus for tires (3), comprising a device (14) structured and arranged for positioning a tire (3) to be inspected, an inspection device (8) structured and arranged to inspect the thus-positioned tire (3) by the positioning device (14), and a pressure chamber (2) structured and arranged to be positioned about said positioning device (14) to encompass the tire (3) positioned thereon, wherein said inspection device (8) comprises several measuring heads (9, 10, 11, 12), said inspection device (8) is structuured and arranged to inspect an inner radial side of the tire (3) positioned upon said positioning device (14), said inspection device (8) comprising said measuring heads (9–12) are structured and arranged to be movable from a position outside the tire (3) to a position within the inner radial edge of the tire 93) positioned upon said positioning device (14) to inspect the inner radial side of the tire (3) for defects, said pressure chamber (2) is a vacuum chamber comprising a movable hood (4), and additionally comprising a vertically movable slide (5) and a guide (6) in which said slide (5) is movably positioned and upon which said vacuum chamber hood (4) is coupled, such that said vacuum chamber hood (4) is movable between an upper position exposing said positioning device (14) and a lower position providing a seal about said positioning device (14) and the tire (3) positioned therein.

\* \* \* \* \*